(12) United States Patent
Chen et al.

(10) Patent No.: US 10,602,175 B2
(45) Date of Patent: Mar. 24, 2020

(54) USING AN AVERAGE MOTION VECTOR FOR A MOTION SEARCH

(71) Applicant: NVIDIA Corporation, Santa Clara, CA (US)

(72) Inventors: Jianjun Chen, Shanghai (CN); Xi He, Shanghai (CN); Xinyang Yu, Shanghai (CN); Hank Fan, Shanghai (CN)

(73) Assignee: NVIDIA CORPORATION, Santa Clara, CA (US)

( * ) Notice: Subject to any disclaimer, the term of this patent is extended or adjusted under 35 U.S.C. 154(b) by 796 days.

(21) Appl. No.: 13/725,613

(22) Filed: Dec. 21, 2012

(65) Prior Publication Data

US 2014/0177716 A1    Jun. 26, 2014

(51) Int. Cl.
H04N 19/513 (2014.01)
H04N 19/56 (2014.01)

(52) U.S. Cl.
CPC .......... H04N 19/513 (2014.11); H04N 19/56 (2014.11)

(58) Field of Classification Search
CPC ... H04N 19/56; H04N 19/0066; H04N 19/513
See application file for complete search history.

(56) References Cited

U.S. PATENT DOCUMENTS

| | | | | |
|---|---|---|---|---|
| 6,424,676 | B1 * | 7/2002 | Kono | H04N 19/51 348/699 |
| 7,813,570 | B2 * | 10/2010 | Shen | H04N 21/4143 382/236 |
| 8,325,812 | B2 * | 12/2012 | Kwon | H04N 5/145 375/240.16 |
| 8,553,776 | B2 * | 10/2013 | Shi | H04N 5/145 375/240.16 |
| 2001/0002205 | A1 * | 5/2001 | Beattie | H04N 19/56 375/240.16 |
| 2007/0177666 | A1 * | 8/2007 | Suman | H04N 19/139 375/240.12 |
| 2007/0236578 | A1 | 10/2007 | Nagaraj et al. | |
| 2009/0015712 | A1 * | 1/2009 | Sato | G06T 3/4007 348/441 |
| 2009/0116556 | A1 * | 5/2009 | Ogawa | H04N 19/513 375/240.16 |
| 2009/0190037 | A1 * | 7/2009 | Chang et al. | 348/699 |

(Continued)

FOREIGN PATENT DOCUMENTS

| | | |
|---|---|---|
| CN | 1163533 | 10/1997 |
| CN | 101340578 | 1/2009 |

(Continued)

*Primary Examiner* — Maria E Vazquez Colon
(74) *Attorney, Agent, or Firm* — Zilka-Kotab, PC

(57) ABSTRACT

A method for using an average motion vector in a motion vector search process. The method includes accessing an input frame for processing and reading average motion vector information from memory. The method further includes performing a motion vector search by using the average motion vector and a plurality of hints, calculating a winner motion vector based on the average motion vector and the plurality of hints, and storing the winner motion vector back into memory to create a new updated average motion vector. The method further includes finishing processing the input frame using the winning motion vector.

20 Claims, 4 Drawing Sheets

(56) References Cited

U.S. PATENT DOCUMENTS

2011/0200107 A1\* 8/2011 Ryu ................. H04N 19/61
375/240.16
2012/0057631 A1\* 3/2012 Le Leannec ........... H04N 19/56
375/240.16

FOREIGN PATENT DOCUMENTS

CN 101588501 11/2009
EP 1870857 12/2007

\* cited by examiner

USING AN AVERAGE MOTION VECTOR FOR A MOTION SEARCH

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives and produce real-time rendered 3-D images.

GPU hardware-based motion-based video compression is now widely implemented. A video compression standard, H.264, supports searching for motion across a large number of reference frames and the encoding of motion vectors for macro blocks (e.g., blocks of around 16×16 pixels).

Although the H.264 motion search calculation does not present a challenge in mathematical terms, it does in the sheer number of required calculations. An object's displacement, i.e. motion, is found by computing the SAD (sum of absolute differences) between the source and the reference frames using 16×16 blocks. Because objects in the frame can move in any direction and by any amount, this search is a very computationally intensive operation.

Thus, a need exists improving the performance of searching for a winning motion vector during an encoding process.

SUMMARY OF THE INVENTION

In one embodiment, the present invention is implemented as a method for using an average motion vector in a motion vector search process. The method includes accessing an input frame for processing and reading average motion vector information from memory. The method further includes performing a motion vector search by using the average motion vector and a plurality of hints, calculating a winner motion vector based on the average motion vector and the plurality of hints, and storing the winner motion vector back into memory to create a new updated average motion vector. The method further includes finishing processing the input frame using the winning motion vector.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
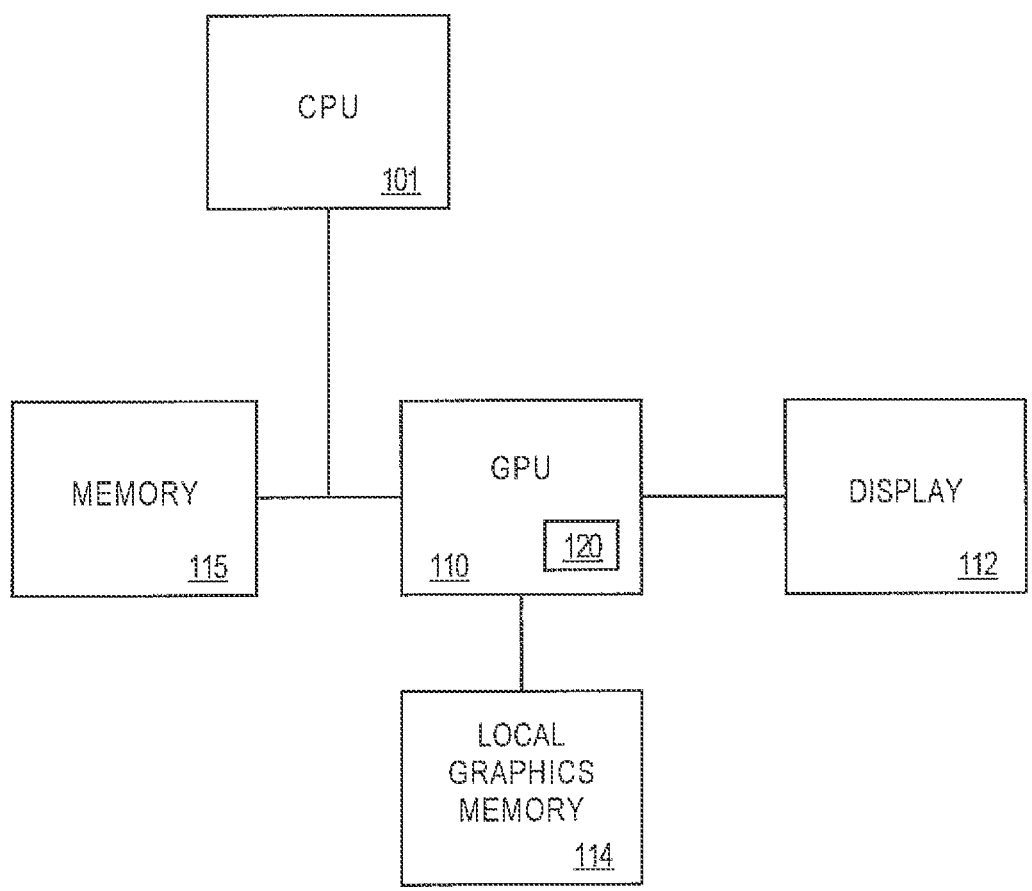
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The GPU 110 further includes a video compression component 120. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

Embodiments of the Invention

Figure 2:
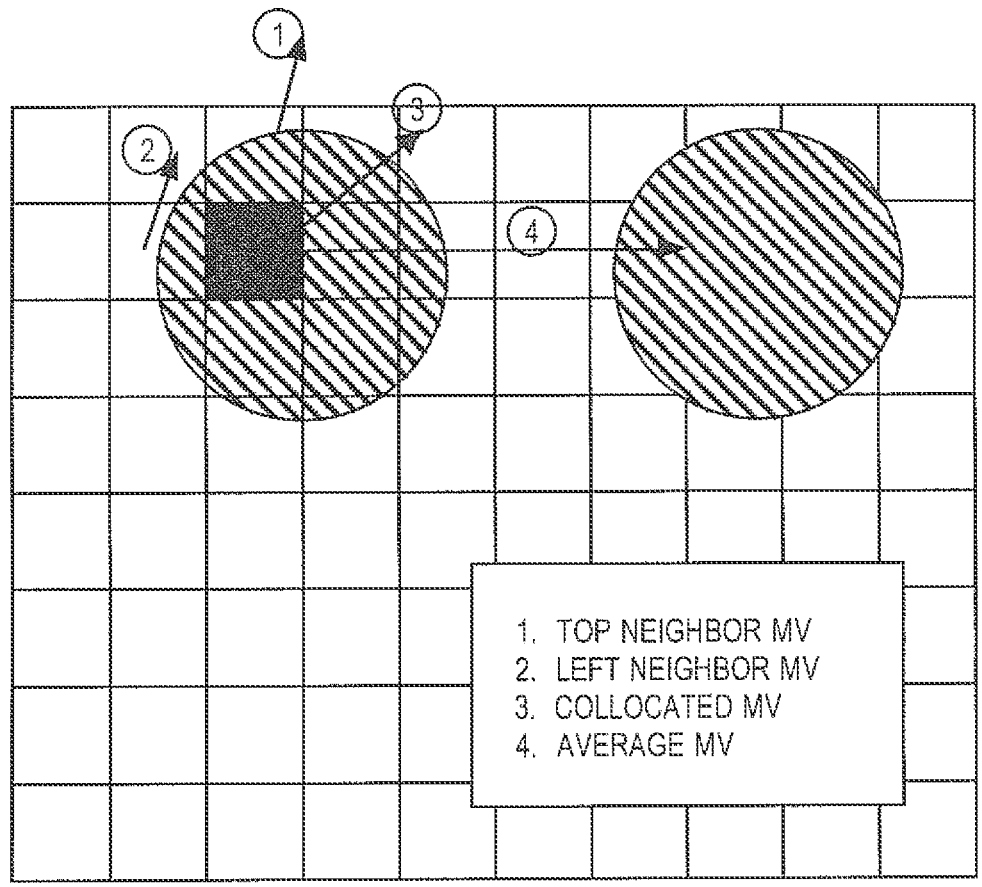
FIG. 2 shows a macro block having motion vector hints in accordance with one embodiment of the present invention.

FIG. 2 shows a macro block having motion vector hints in accordance with one embodiment of the present invention. In video compression, a critical step is to search the motion vector. Motion vector represents an object or scene movement compared to reference frame, a good motion vector can bring better video quality with less bit-stream size.

Usually there are several hints to help motion search. As shown in FIG. 2, the hints are top neighbor my, left neighbor my, collocated my, zero mv(0,0). A search engine of the video encoder will search a fixed window around the hints.

In one embodiment, for low motion movement, the search engine can easily hit the real motion vector. While in high motion cases, it is hard to hit the real motion vector because there are no good hints. Unfortunately, high motion is a typical video compression case caused by, for example, camera movements. Additionally, it can be worse if the video compressor is encoding with a B frame since the motion will be even higher.

Embodiments of the present invention improve motion search in high motion cases by using an average my hint to help motion search (e.g., as shown in FIG. 1). The average my hint is the average my value when encoding a previous frame or a plurality of previous frames. The search engine will accumulate each winner my value, and calculate the average my hint before encoding the current frame. In a typical camera movement case, the movement is close for all parts in current frame, so the average my can represent a correct movement for each macro block.

It should be noted that, in one embodiment, since the average my is the movement compared to reference frame, it needs to be scaled based on the distance between current frame and reference frame.

By using an average my hint for motion search, embodiments of the present invention have improved video quality in high motion cases. This is shown in FIG. 3 below.

Figure 3:
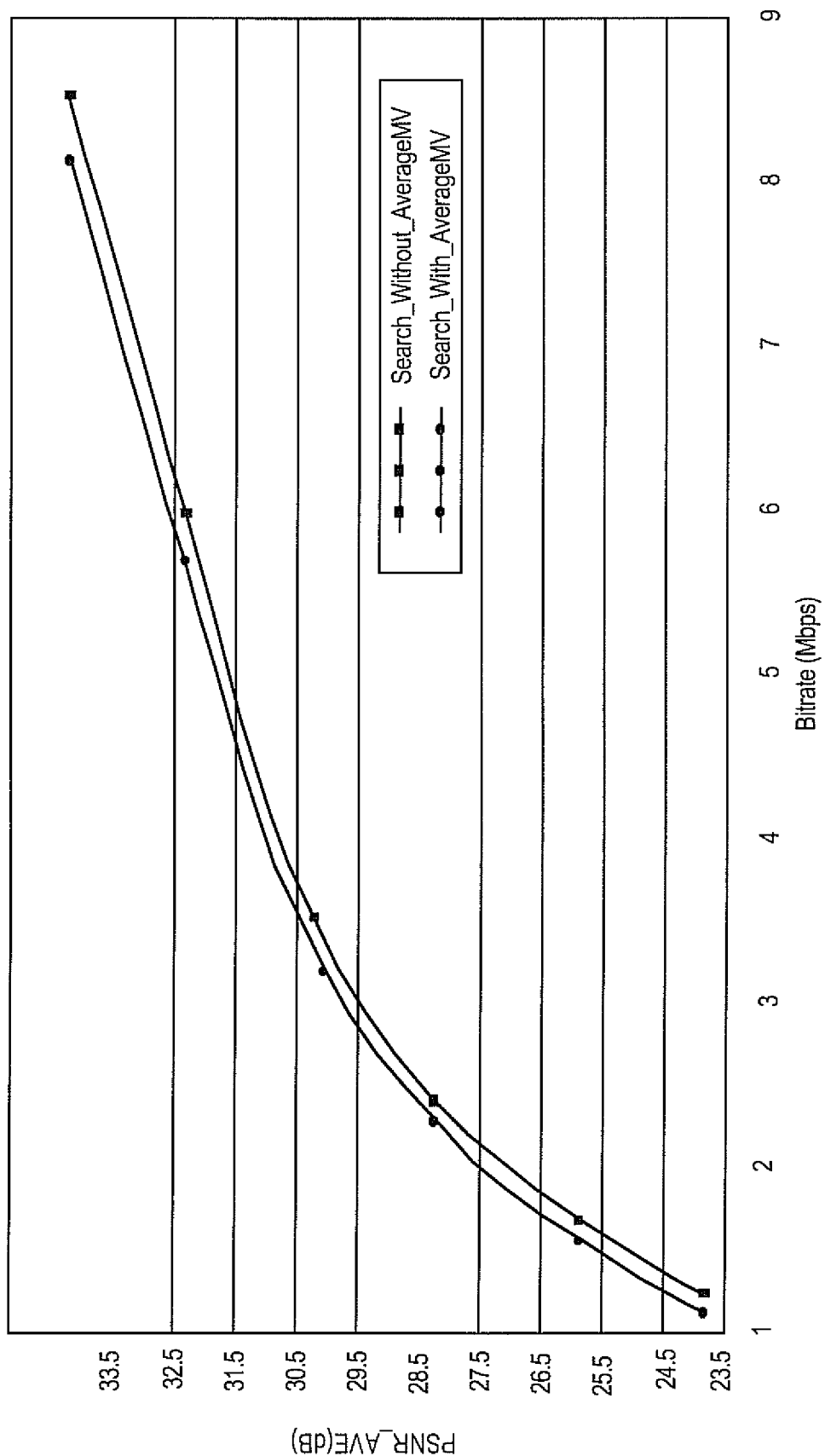
FIG. 3 shows a diagram showing peak signal-to-noise ratios over a range of bit rates while using a video compression process in accordance with one embodiment of the present invention.

FIG. 3 shows a diagram showing peak signal-to-noise ratios over a range of bit rates while using a video compression process in accordance with one embodiment of the present invention. As depicted in FIG. 3, experiments show the PSNR (peak signal-to-noise ratio) can be improved with same bitrate for a high motion sequence when using a video compression process in accordance with the present invention.

Figure 4:
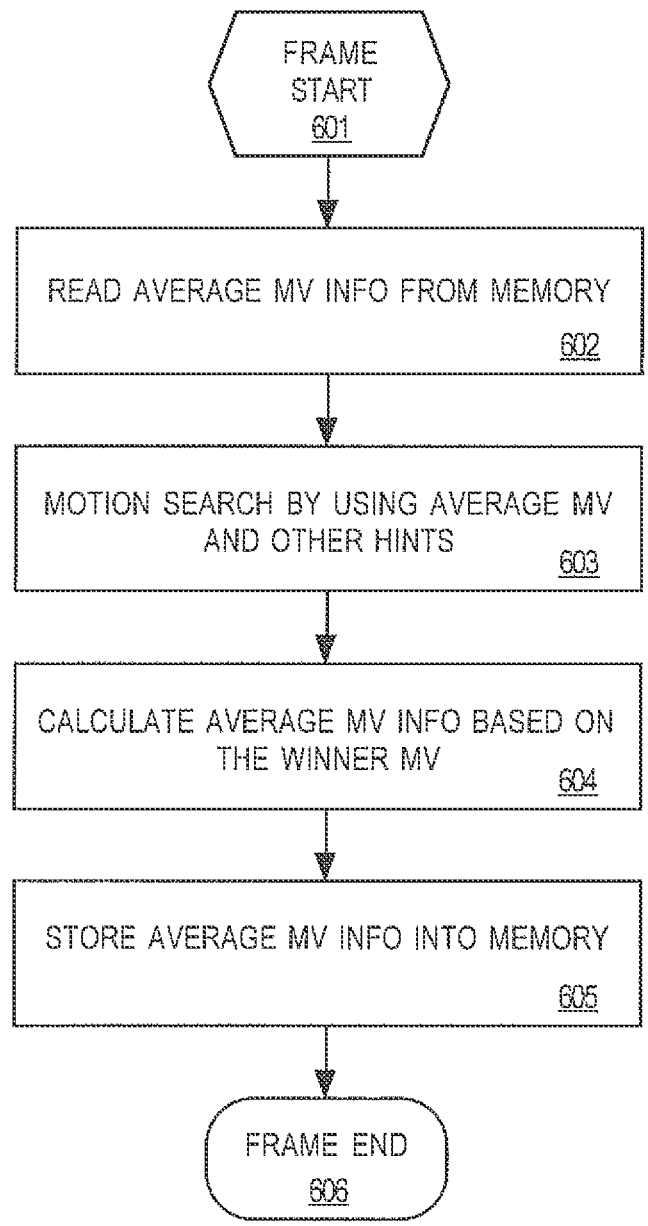
FIG. 4 shows a flowchart of the steps of a motion vector search process 600 in accordance with one embodiment of the present invention.

FIG. 4 shows a flowchart of the steps of a motion vector search process 600 in accordance with one embodiment of the present invention. Process 600 begins in step 601 wherein an input frame begins processing. In step 602, the algorithm reads the average motion vector information from memory. In step 603, the search engine begins motion search by using the average motion vector and the other hints. In step 604, the average motion vector information is calculated based on a winner motion vector. In step 605, the average motion vector information is stored back into memory for use on a subsequent frame. In step 606, the input frame finishes processing and is output.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for using an average motion vector in a motion vector search process, comprising:
   accessing an input frame for processing;
   reading average motion vector information from memory, wherein the average motion vector comprises an average of a plurality of prior winning motion vectors computed when encoding a plurality of previous frames;
   performing a motion vector search by using the average motion vector and a plurality of hints;
   responsive to said motion vector search, calculating a winner motion vector based on the average motion vector and the plurality of hints;
   storing the winner motion vector back into the memory to create a new updated average motion vector; and
   finishing processing the input frame using the winner motion vector.

2. The method of claim 1, wherein the motion vector search implements a video compression process.

3. The method of claim 1, wherein the motion vector search is performed on a macro block.

4. The method of claim 1, wherein a plurality of winner motion vector values are calculated and an average motion vector hint is calculated before encoding a current frame.

5. The method of claim 1, wherein the motion vector search is implemented in a graphics processing unit.

6. The method of claim 1, wherein the average motion vector is scaled based on a distance between a current frame and a reference frame.

7. A non-transitory computer readable media having computer readable code which when executed by a computer system causes said computer system to implement a method for using an average motion vector in a motion vector search process, the method comprising:
   accessing an input frame for processing;
   reading average motion vector information from memory, wherein the average motion vector comprises an average of a plurality of prior winning motion vectors computed when encoding a plurality of previous frames;
   performing the motion vector search process by using the average motion vector and a plurality of hints;
   responsive to the motion vector search process, calculating a winner motion vector based on the average motion vector and the plurality of hints;
   storing the winner motion vector back into the memory to create a new updated average motion vector; and
   finishing processing the input frame using the winner motion vector.

8. The non-transitory computer readable media of claim 7, wherein the motion vector search process implements a video compression process.

9. The non-transitory computer readable media of claim 7, wherein the motion vector search process is performed on a macro block.

10. The non-transitory computer readable media of claim 7, wherein a plurality of winner motion vector values are calculated and an average motion vector hint is calculated before encoding a current frame.

11. The non-transitory computer readable media of claim 7, wherein the motion vector search process is implemented in a graphics processing unit.

12. The non-transitory computer readable media of claim 7, wherein the average motion vector is scaled based on a distance between a current frame and a reference frame.

13. A computer system, comprising:
   a computer system having a processor coupled to a computer readable storage media and executing computer readable code which causes the computer system to:
   access an input frame for processing;
   read average motion vector information from memory, wherein the average motion vector comprises an average of a plurality of prior winning motion vectors computed when encoding a plurality of previous frames;
   perform a motion vector search process by using the average motion vector information and a plurality of hints;
   responsive to said motion vector search process, calculate a winner motion vector based on the average motion vector and the plurality of hints;
   store the winner motion vector back into the memory to create a new updated average motion vector; and
   finish processing the input frame using the winner motion vector.

14. The computer system of claim 13, wherein the motion vector search process implements a video compression process.

15. The computer system of claim 13, wherein the motion vector search process is performed on a macro block.

16. The computer system of claim 13, wherein a plurality of winner motion vector values are calculated and an average motion vector hint is calculated before encoding a current frame.

17. The computer system of claim 13, wherein the average motion vector is scaled based on a distance between a current frame and a reference frame.

18. The method of claim 1, wherein the plurality of hints comprises: a top neighbor motion vector, a left neighbor motion vector, and a collocated motion vector.

19. The non-transitory computer readable media of claim 7, wherein the plurality of hints comprises: a top neighbor motion vector, a left neighbor motion vector, and a collocated motion vector.

20. The computer system of claim 13, wherein the plurality of hints comprises: a top neighbor motion vector, a left neighbor motion vector, and a collocated motion vector.

* * * * *